US008599146B2

(12) United States Patent
Utsunomiya et al.

(10) Patent No.: US 8,599,146 B2
(45) Date of Patent: Dec. 3, 2013

(54) LIQUID CRYSTAL DEVICE, ELECTRONIC APPARATUS AND POSITION IDENTIFICATION METHOD FOR IDENTIFYING A POSITION OF AN OBJECT

(75) Inventors: Sumio Utsunomiya, Matsumoto (JP); Takeshi Koshihara, Suwa (JP)

(73) Assignee: Japan Display West Inc., Aichi-Ken (JP)

( * ) Notice: Subject to any disclaimer, the term of this patent is extended or adjusted under 35 U.S.C. 154(b) by 1486 days.

(21) Appl. No.: 12/037,590

(22) Filed: Feb. 26, 2008

(65) Prior Publication Data

US 2008/0224971 A1    Sep. 18, 2008

(30) Foreign Application Priority Data

Mar. 13, 2007  (JP) .................................. 2007-062980

(51) Int. Cl.
*G06F 3/041* (2006.01)
(52) U.S. Cl.
USPC ............................................................ 345/173
(58) Field of Classification Search
USPC ................. 345/104, 156–158, 173–174, 179; 178/18.01–19.03, 20.04; 349/12
See application file for complete search history.

(56) References Cited

U.S. PATENT DOCUMENTS

| | | | |
|---|---|---|---|
| 5,831,597 A | 11/1998 | West et al. | |
| 7,030,860 B1 | 4/2006 | Hsu et al. | |
| 8,274,481 B2 * | 9/2012 | Nishimura et al. | 345/173 |
| 2004/0217945 A1 | 11/2004 | Miyamoto et al. | |
| 2005/0168450 A1 * | 8/2005 | Ito | 345/173 |
| 2005/0184971 A1 * | 8/2005 | Ogino et al. | 345/173 |
| 2008/0150905 A1 * | 6/2008 | Grivna et al. | 345/173 |
| 2008/0179112 A1 * | 7/2008 | Qin et al. | 178/18.06 |
| 2013/0021283 A1 * | 1/2013 | Nishimura et al. | 345/173 |

FOREIGN PATENT DOCUMENTS

| | | |
|---|---|---|
| JP | A-05-019233 | 1/1993 |
| JP | A-08-044493 | 2/1996 |
| JP | A-2000-081610 | 3/2000 |
| JP | A-2000-511314 | 8/2000 |
| JP | A-2003-511799 | 3/2003 |
| JP | A-2004-21327 | 1/2004 |

* cited by examiner

*Primary Examiner* — Rodney Amadiz
(74) *Attorney, Agent, or Firm* — K&L Gates LLP (57) ABSTRACT

A liquid crystal device includes a liquid crystal panel, a plurality of detection electrodes, a switching circuit, and a position identification device. The liquid crystal panel is configured so that a liquid crystal is sealed in a gap between a first substrate and a second substrate, which are opposed to each other, and a voltage of an opposite electrode opposite the liquid crystal periodically varies. The plurality of detection electrodes are provided on a side opposite to a side on which the liquid crystal is provided via the first substrate, wherein an initial voltage is induced in each of the plurality of detection electrodes on the basis of a variation in voltage of the opposite electrode. The switching circuit sequentially connects each of the plurality of detection electrodes, in which the initial voltages are induced, to a detection portion. The position identification device generates a position signal that indicates a position of a pointing body on the basis of a detection signal produced in the detection portion.

7 Claims, 7 Drawing Sheets

FIG. 11

LIQUID CRYSTAL DEVICE, ELECTRONIC APPARATUS AND POSITION IDENTIFICATION METHOD FOR IDENTIFYING A POSITION OF AN OBJECT

BACKGROUND

1. Technical Field

The present invention relates to a technology for identifying a position, at which an object (hereinafter, referred to as pointing body), such as a finger or a pen, is in contact with a display surface of a liquid crystal device, which displays an image.

2. Related Art

An existing liquid crystal device with a touch panel that uses an electrostatic capacitance method has been proposed. As described in JP-A-5-19233, JP-A-8-44493, JP-A-2000-81610 and JP-T-2003-511799, detection electrodes are formed on a viewing side of the liquid crystal device. The position of the pointing body is identified on the basis of a signal that is obtained by detecting a variation in electrostatic capacitance of each detection electrode.

In the meantime, a parasitic capacitance is formed between the detection electrodes and electrodes or wirings of the liquid crystal device. Thus, when various signals used for displaying an image vary in the liquid crystal device, there is a problem that noise is induced in the detection electrodes. Noise in the detection electrodes causes a decrease in accuracy of position identification of the pointing body.

SUMMARY

An advantage of some aspects of the invention is that it suppresses a decrease in detection accuracy due to noise in the detection electrodes.

An aspect of the invention provides a liquid crystal device. The liquid crystal device includes a liquid crystal panel, a plurality of detection electrodes, a switching circuit, and a position identification device. The liquid crystal panel is configured so that a liquid crystal is sealed in a gap between a first substrate and a second substrate, which are opposed to each other, and a voltage of an opposite electrode opposite the liquid crystal periodically varies. The plurality of detection electrodes are provided on a side opposite to a side on which the liquid crystal is provided via the first substrate, wherein an initial voltage is induced in each of the plurality of detection electrodes on the basis of a variation in voltage of the opposite electrode. The switching circuit sequentially connects each of the plurality of detection electrodes, in which the initial voltages are induced, to a detection portion. The position identification device generates a position signal that indicates a position of a pointing body on the basis of a detection signal produced in the detection portion. The liquid crystal device according to the aspect of the invention may be used in various electronic apparatuses, such as a personal computer or a cellular phone.

In the above configuration, because the initial voltage induced in each of the detection electrodes because of a variation in voltage of the opposite electrode is used to identify a position of the pointing body, the variation in voltage of the opposite electrode never causes a decrease in detection accuracy. Thus, it is possible to identify a position of the pointing body in high accuracy.

In the aspect of the invention, the position identification device may be configured to generate the position signal on the basis of the length of time during which a voltage of the detection signal is outside a predetermined range because of the detection electrode being connected to the detection portion. According to the above configuration, the desired advantageous effects may be obtained with a simple configuration in which the length of time of a period during which the voltage of the detection signal is outside a predetermined range (a period during which the voltage of the detection signal is higher than an upper limit value of the predetermined range or a period during which the voltage of the detection signal is lower than a lower limit value of the predetermined range) is measured.

The liquid crystal device according to the aspect of the invention may include an electric discharge device that, when a voltage of the detection signal is first changed to go outside a predetermined range by connecting a corresponding one of the detection electrodes to the detection portion and then changed to fall within the predetermined range, discharges electric charge stored in the corresponding one of the detection electrodes. In the above aspect, because electric charge stored in the detection electrode is discharged when the voltage of the detection signal is changed to fall within the predetermined range, when a position of the pointing body is identified multiple times, it is possible to identify the position with high accuracy by excluding the influence of electric charge stored in the detection electrode in the preceding identification.

In the aspect of the invention, the opposite electrode may be continuously formed over the entire surface of the first substrate, which is opposite the liquid crystal. Furthermore, in the aspect of the invention, the plurality of detection electrodes may be formed on a side of the first substrate, which is opposite to a side on which the liquid crystal is provided, and may be opposed to the opposite electrode via the first substrate. According to the above aspect, an initial voltage corresponding to a variation in voltage of the opposite electrode may be reliably induced in each of the detection electrodes.

Another aspect of the invention provides a method of identifying a position of a pointing body in a liquid crystal device. The liquid crystal device includes a liquid crystal panel and a plurality of detection electrodes. The liquid crystal panel is configured so that a liquid crystal is sealed in a gap between a first substrate and a second substrate, which are opposed to each other, and a voltage of an opposite electrode that is opposite the liquid crystal periodically varies. The plurality of detection electrodes are provided on a side opposite to a side on which the liquid crystal is provided via the first substrate, wherein an initial voltage of each of the plurality of detection electrodes is induced on the basis of a variation in voltage of the opposite electrode. The method of identifying a position of the pointing body according to the aspect of the invention includes sequentially connecting each of the plurality of detection electrodes, in which the initial voltages are induced, to a detection portion, and generating a position signal that indicates a position of the pointing body on the basis of a detection signal produced in the detection portion. According to the above method, the same function and advantageous effects as those of the liquid crystal device according to the aspect of the invention are obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

A: First Embodiment

Figure 1:
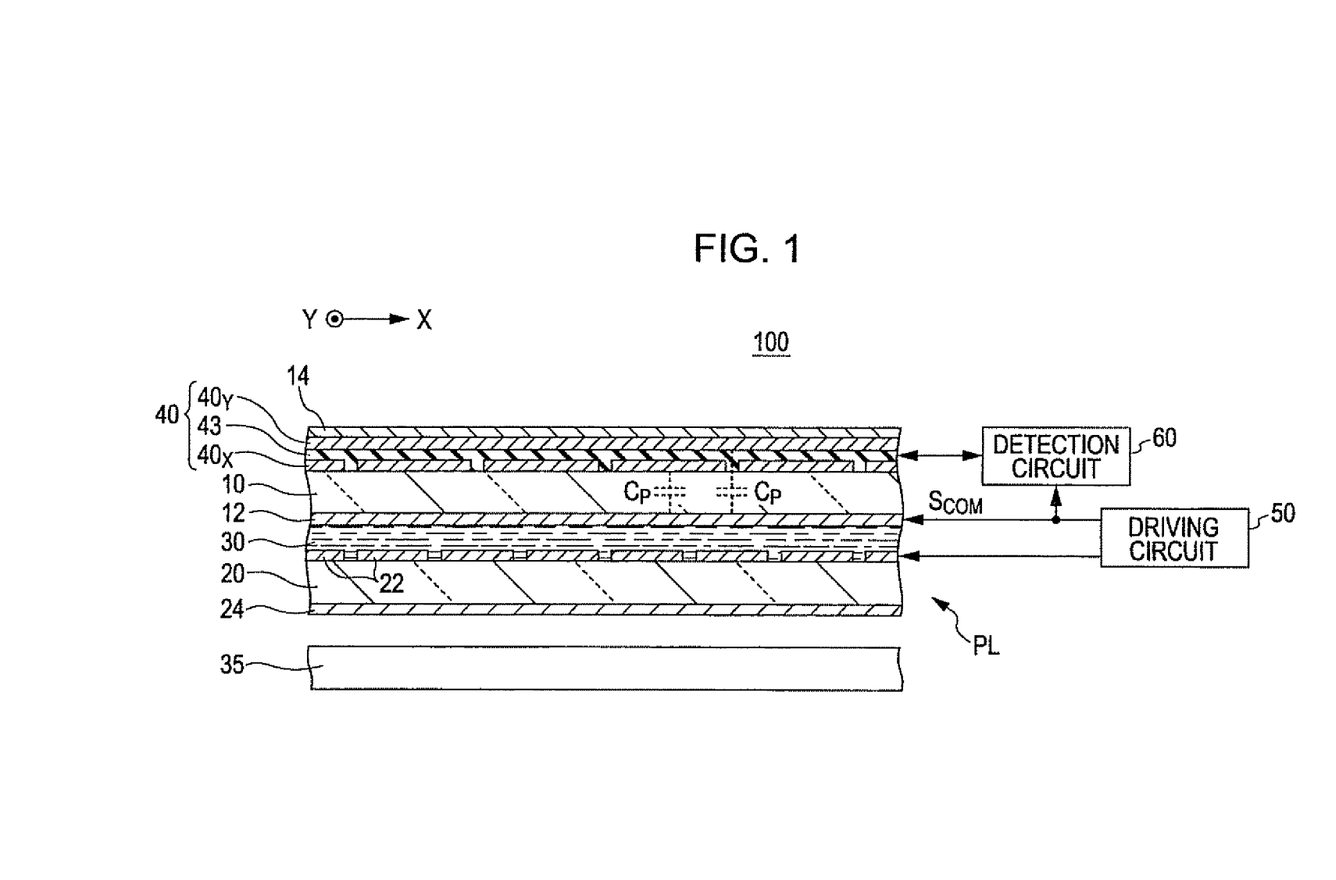
FIG. 1 is a cross-sectional view that shows a configuration of a liquid crystal device according to an embodiment of the invention.

FIG. 1 is a cross-sectional view that shows a configuration of a liquid crystal device according to a first embodiment of the invention. The liquid crystal device 100 is an electrostatic-capacitance-type touch panel liquid crystal display device liquid crystal that has a function of displaying an image by means of optical action of a liquid crystal and a function of detecting a position of a pointing body (finger or pen) that is in contact with or is in proximity to the front face of the liquid crystal device 100 in response to a variation in electrostatic capacitance. As shown in FIG. 1, the liquid crystal device 100 includes a liquid crystal panel PL having a structure such that a liquid crystal 30 is sealed in a gap between a first substrate 10 and a second substrate 20, which are opposed to each other. The first substrate 10 and the second substrate 20 are optically transparent plate materials. The first substrate 10 is located on the viewing side (user side) of the liquid crystal device 100. Note that, in FIG. 1, an alignment layer and a seal material are not shown.

A plurality of pixel electrodes 22 are formed on a surface of the second substrate 20, which is opposite the first substrate 10, and are spaced apart from one another. An optically transparent opposite electrode 12 is formed on a surface of the first substrate 10, which is opposite the second substrate 20. The opposite electrode 12 is continuously formed over the entire surface of the first substrate 10 and is opposed to the liquid crystal 30 and the plurality of pixel electrodes 22. A driving circuit 50 shown in FIG. 1 supplies a common signal SCOM to the opposite electrode 12 and also controls a voltage of each of the pixel electrodes 22 in accordance with an image signal. Alignment of the liquid crystal 30 located between the opposite electrode 12 and each of the pixel electrodes 22 varies on the basis of a voltage applied between the electrodes. Thus, a desired image corresponding to the image signal is displayed.

Figure 2:
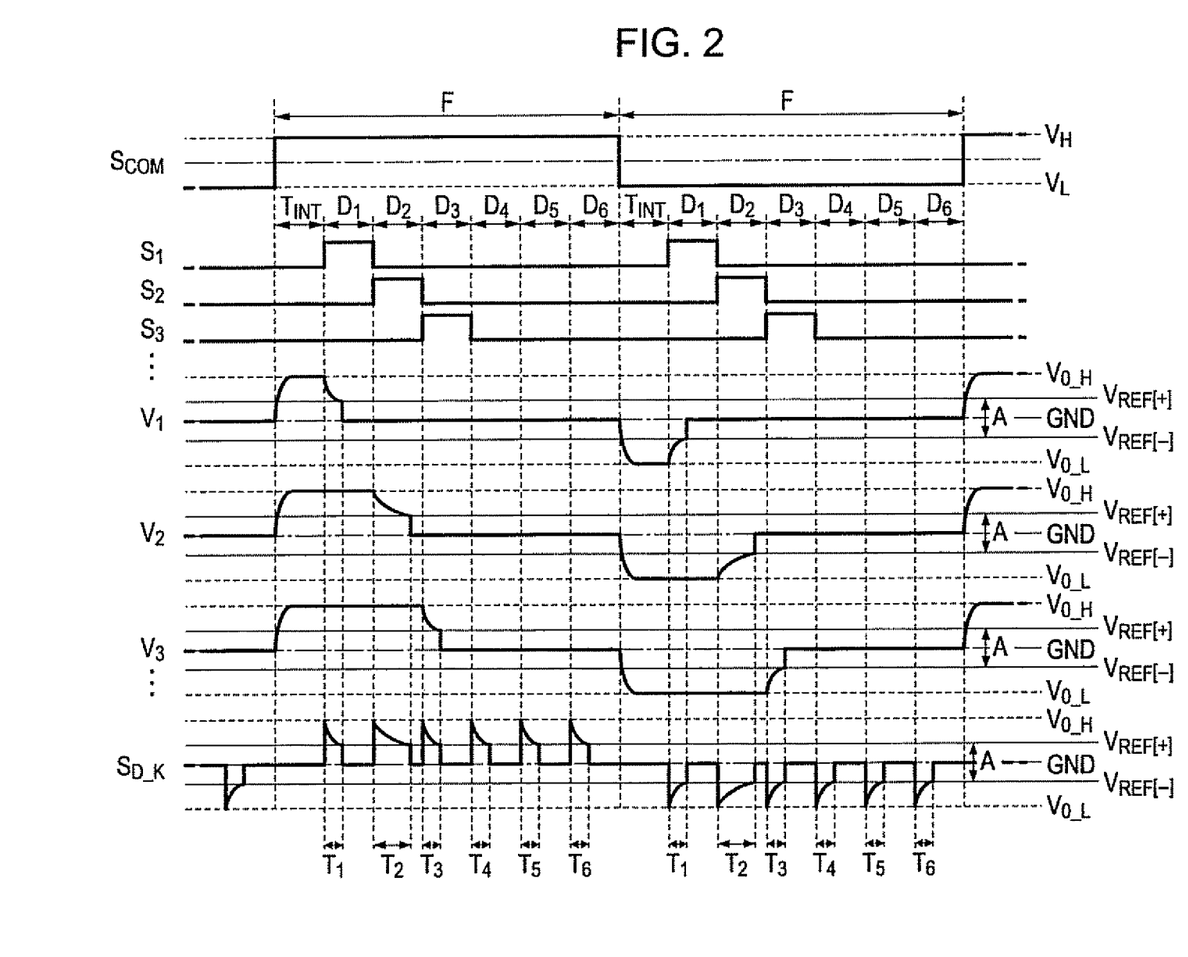
FIG. 2 is a timing chart that illustrates an operation of the liquid crystal device.

FIG. 2 is a timing chart that illustrates an operation in which the liquid crystal device 100 identifies a position of the pointing body. As shown in FIG. 2, the common signal SCOM is a voltage signal that periodically varies from one of a voltage VH and a voltage VL to the other every frame period F. The voltage VH is higher than the voltage VL. By periodically varying the voltage of the common signal SCOM as described above, it is advantageous in that the amplitude of voltage (data signal) supplied to each of the pixel electrodes 22 is reduced.

Figure 3:
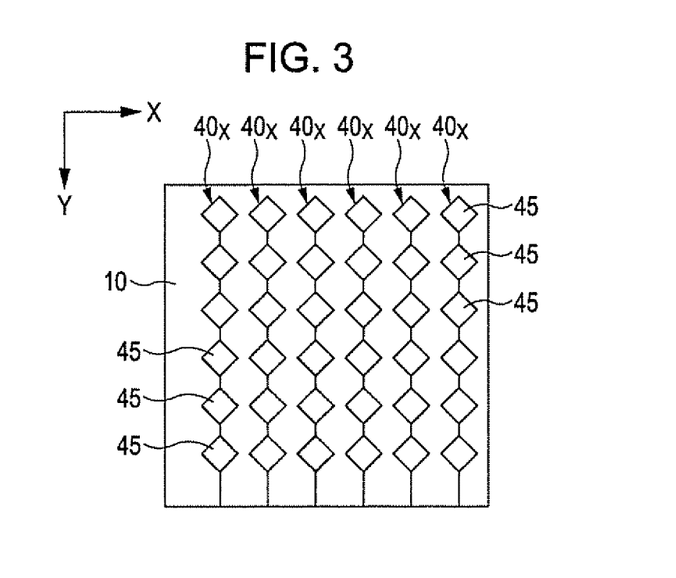
FIG. 3 is a plan view that shows an embodiment of detection electrodes that detect a position of a pointing body in an X direction.
Figure 4:
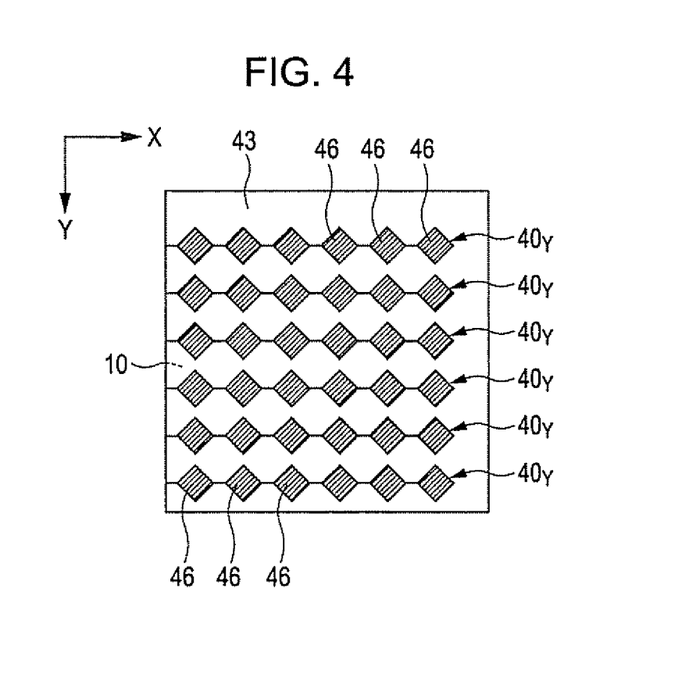
FIG. 4 is a plan view that shows an embodiment of detection electrodes that detect a position of a pointing body in a Y direction.

As shown in FIG. 1, an electrode layer 40 is formed on a surface of the first substrate 10, which is opposite to a side on which the liquid crystal 30 is provided, and is used to detect the pointing body. The electrode layer 40 is a laminated layer that includes a plurality of detection electrodes 40X, an insulating layer 43 and a plurality of detection electrodes 40Y. FIG. 3 is a view that shows an embodiment of the plurality of detection electrodes 40X. FIG. 4 is a view that shows the plurality of detection electrodes 40Y. FIG. 3 and FIG. 4 are plan views as viewed from the viewing side (upper side) of FIG. 1. Note that the plurality of detection electrodes 40Y are shown with diagonal lines for the sake of convenience. In addition, hereinafter, a configuration that is provided with six detection electrodes 40X and six detection electrodes 40Y is exemplified for the sake of convenience; however, the number of detection electrodes 40X and the number of detection electrodes 40Y may be selected. The number of detection electrodes 40X may be different from the number of detection electrodes 40Y.

The plurality of detection electrodes 40X are elongated conductive films that are formed on the surface of the first substrate 10 and arranged parallel with one another in an X direction. The detection electrodes 40X are used to detect a position of the pointing body in the X direction. As shown in FIG. 3, each of the detection electrodes 40X is a conductive film that connects a plurality of electrodes 45, which are arranged in the Y direction, with one another. As shown in FIG. 1, the insulating layer 43 is an optically transparent film that coats the plurality of detection electrodes 40X over the entire area of the first substrate 10. The plurality of detection electrodes 40Y are elongated conductive films that are arranged parallel with one another in the Y direction and are used to detect a position of the pointing body in the Y direction. The plurality of detection electrodes 40Y are formed on the surface of the insulating layer 43. Thus, each of the detection electrodes 40X and each of the detection electrodes 40Y are electrically insulated by the insulating layer 43. Each of the detection electrodes 40X and each of the detection electrodes 40Y are formed of optically transparent conductive material (for example, ITO (Indium Tin Oxide)).

Figure 5:
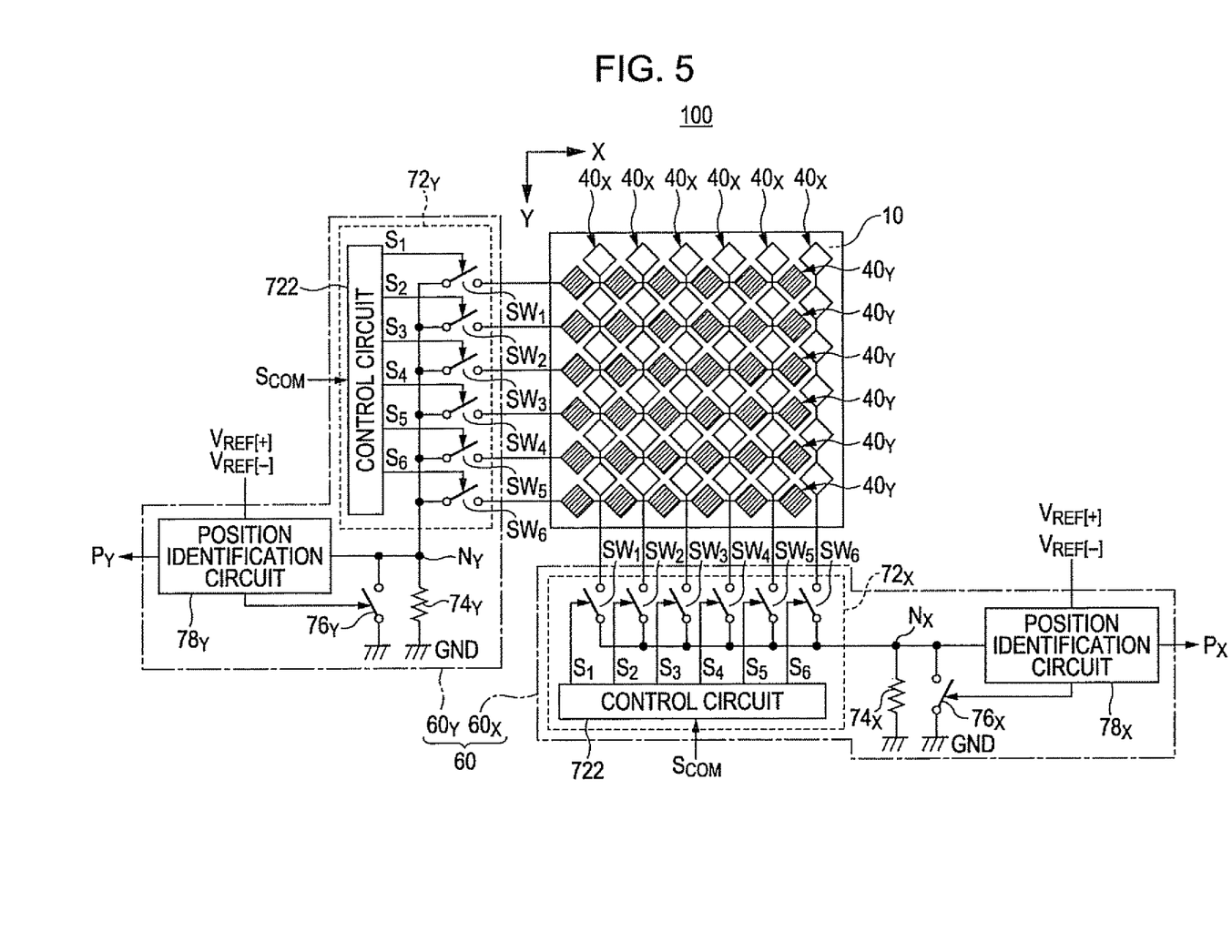
FIG. 5 is a block diagram that shows an electrical configuration of elements that identify a position of the pointing body.

As shown in FIG. 4, each of the detection electrodes 40Y is a conductive film that connects a plurality of electrodes 46, which are arranged in the X direction, with one another. As shown in FIG. 5, electrodes 45 of each detection electrode 40X and electrodes 46 of each detection electrode 40Y are arranged so as not to overlap each other as viewed in a direction perpendicular to the first substrate 10. As shown in FIG. 1, both the detection electrodes 40X and the detection electrodes 40Y are opposed to the opposite electrode 12 via the first substrate 10. Thus, capacitances (parasitic capacitances) CP are formed between the detection electrodes 40X and the opposite electrode 12 and between the detection electrodes 40Y and the opposite electrode 12.

A detection circuit 60 shown in FIG. 1 is a device that identifies a position of the pointing body on the basis of a variation in electrostatic capacitances of each of the detection electrodes 40X and each of the detection electrodes 40Y. The common signal SCOM output from the driving circuit 50 is not only supplied to the opposite electrode 12 but also supplied to the detection circuit 60. Note that the detection circuit 60 may be formed of one or plurality of integrated circuits or may be formed of thin-film transistors formed on the surface of the first substrate 10. In addition, the detection circuit 60 may be mounted on one integrated circuit together with all or part of the driving circuit 50.

A polarizer 14 is adhered onto the surface of the electrode layer 40. Similarly, a polarizer 24 is adhered onto the surface of the second substrate 20, which is opposite to a side on which the liquid crystal 30 is provided. In addition, a lighting unit 35 is arranged on a rear side of the liquid crystal device 100. Light emitted from the lighting unit 35 passes the second substrate 20, the liquid crystal 30, the first substrate 10 and the electrode layer 40 in the stated order and exits toward the viewing side to thereby display an image. Note that a configuration in which the polarizer 14 is formed between the first substrate 10 and the electrode layer 40 may also be employed.

FIG. 5 is a block diagram that shows a specific configuration of elements that identify a position of the pointing body. As shown in the drawing, the detection circuit 60 is classified into a detection circuit 60X and a detection circuit 60Y. The detection circuit 60X detects a position of the pointing body in the X direction using the plurality of detection electrodes 40X. The detection circuit 60Y detects a position of the pointing body in the Y direction using the plurality of detection electrodes 40Y.

The detection circuit 60X includes a switching circuit 72X, a resistance 74X, a switch 76X and a position identification circuit 78X. Similarly, the detection circuit 60Y includes a switching circuit 72Y, a resistance 74Y, a switch 76Y and a position identification circuit 78Y. As described above, because the detection circuit 60X and the detection circuit 60Y have the same configurations, in the following description, the configuration and operation of both the detection circuit 60X and the detection circuit 60Y will be described together using a reference sign K (K=X, Y) that represents both of them.

The switching circuit 72K shown in FIG. 5 is a device that sequentially connects the six detection electrodes 40K to a detection portion (node) NK. The switching circuit 72K of the present embodiment is provided with six switches SW1 to SW6 corresponding to the number of detection electrodes 40K and a control circuit 722 that generates selection signals S1 to S6 for controlling the switches SW1 to SW6. As shown in FIG. 2, the selection signals S1 to S6 sequentially attain a high level after an initialization period TINT that begins from time point (start point of each frame period F) at which the voltage of the common signal SCOM changes has elapsed. Periods (hereinafter, referred to as "detection periods") D1 to D6 during which the corresponding selection signals S1 to S6 are at a high level do not overlap each other. A shift register that sequentially shifts a pulse signal by taking a variation in the common signal SCOM supplied from the driving circuit 50 as a trigger is appropriately employed as the control circuit 722.

As shown in FIG. 5, the switch SWi (i=1 to 6) is connected between the i-th detection electrode 40K of the electrode layer 40 and the detection portion NK and controls electrical connection (conduction/non-conduction) therebetween. The switch SWi is in a conductive state during the detection period Di when the selection signal Si is set to a high level, and is in a non-conductive state (high impedance state) during a period when the selection signal Si maintains a low level. Thus, the six detection electrodes 40K are sequentially connected to the detection portion NK one by one every detection period Di. As described above, each of the detection electrodes 40K is sequentially connected, so that the voltage of the detection portion NK varies. The voltage of the detection portion NK is supplied as a detection signal SD_K to the position identification circuit 78K.

The resistance 74K is connected between the detection portion NK and a ground wire (ground electric potential GND). Similarly, the switch 76K is connected between the detection portion NE and the ground wire. The switch 76K is in a conductive state when the voltage of the detection signal SD_K (the voltage of the detection portion NK) is within a range A from a voltage VREF[+] to a voltage VREF[−]. As shown in FIG. 2, the voltage VREF[+] and the voltage VREF[−] have reverse polarities using the ground electric potential GND as a reference, and their absolute values are equal. When the voltage of the detection signal SD_K is higher than the voltage VREF[+] or when the voltage of the detection signal SD_K is lower than the voltage VREF[−] (when the voltage of the detection signal SD_K is outside the range A), the switch 76K is controlled to be in a non-conductive state.

Next, with reference to FIG. 2, the operation to generate the detection signal SD_K will be described. During the initialization period TINT, the switches SW1 to SWS of the switching circuit 72K maintain a high impedance state. Thus, the six detection electrodes 40K are in a floating state in which the six detection electrodes 40K are electrically insulated from the detection portion NK. A capacitance CP is formed between each detection electrode 40K and the opposite electrode 12, so that, as shown in FIG. 2, when the voltage (common signal SCOM) of the opposite electrode 12 varies at a start point of a frame period F, an initial voltage V0 (V0_H, V0_L) corresponding to the amount of change in voltage of the common signal SCOM is induced in each of the six detection electrodes 40K. That is, as shown in FIG. 2, the voltages (V1, V2, V3, . . . ) of the six detection electrodes 40K are initialized to a high-level initial voltage V0_H when the common signal SCOM is increased from the voltage VL to the voltage VH, and are initialized to a low-level initial voltage V0_L when the common signal SCOM is decreased from the voltage VH to the voltage VL. The initialization period TINT is set to a period that is longer than the length of time from time point (start point of the frame period F) at which the voltage of the common signal SCOM varies until the voltages of the six detection electrodes 40K become stable at an initial voltage V0.

After the initialization period TINT has elapsed, each of the switches SW1 to SW6 is sequentially conducted every detection period Di. When the i-th detection electrode 40K is connected to the detection portion NK because of conduction of the switch SWi, as shown in FIG. 2, the voltage Vi of the detection electrode 40K approaches from the initial voltage V0 that is set in the initialization period TINT to the ground electric potential GND over time by the discharge through the resistance 74K. Thus, the voltage of the detection signal SD_K (the voltage of the detection portion NK), after varied to the initial voltage Vo at the starting point of the detection period Di, approaches to the ground electric potential GND over time, and the voltage of the detection signal SD_K, at the time point when it reaches a voltage closer to the ground electric potential CND than the voltage VREF[+] and the VREF[−], is set to the ground electric potential CND in such a manner that the switch 76K is conducted. More specifically, in the detection period Di within the frame period F in which the common signal SCOM is set to the voltage VH, the voltage of the detection signal SDLK, after it increases to the voltage V0_H, gradually decreases and, when it becomes lower than the voltage VREF[+], decreases to the ground electric potential GND. Similarly, in the detection period Di within the frame period F in which the common signal SCOM is set to the voltage VL, the voltage of the detection signal SDK, after it decreases to the voltage V0_L, gradually increases and, when it becomes higher than the voltage VREF [+], increases to the ground electric potential GND.

Figure 6:
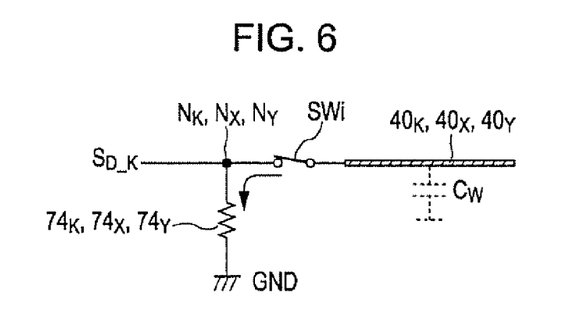
FIG. 6 is a circuit diagram that shows a state where an electric charge stored in the detection electrode is discharged.

FIG. 6 is an equivalent circuit diagram that shows a state where, in the detection period Di, the i-th detection electrode 40K is connected to the detection portion NK. As indicated by the arrow in the drawing, as electric charge stored in the detection electrode 40K is discharged through the resistance 74K, the voltage of the detection signal SD_K approaches to the ground electric potential GND at a rate of change corresponding to the time constant that is estimated by integrating the resistance value of the resistance 74K and the capacitance value of the capacitance (hereinafter, referred to as "wiring capacitance") CW that is associated with the detection electrode 40K.

When the pointing body is in contact with or in proximity to the detection electrode 40K, a capacitance value of the wiring capacitance CW (capacitance formed between the detection electrode 40K and the pointing body) increases. Thus, a rate of change by which the voltage of the detection signal SD_K approaches the ground electric potential GND when the pointing body is in proximity to the detection electrode 40K is lower than that when the pointing body is spaced apart from the detection electrode 40K. For example, in FIG. 2, it is assumed that the pointing body is in proximity to the second detection electrode 40K. Thus, the length of time T2 during which the detection signal SD_K is outside the range A in the detection period D2 (when the switch SW2 is in a conductive state) is longer than the lengths of time T (T1, T3 to T5) during which the detection signals SD_K are outside the range A when the other switches SW (SW1, SW3 to SW6) are in a conductive state.

Figure 7:
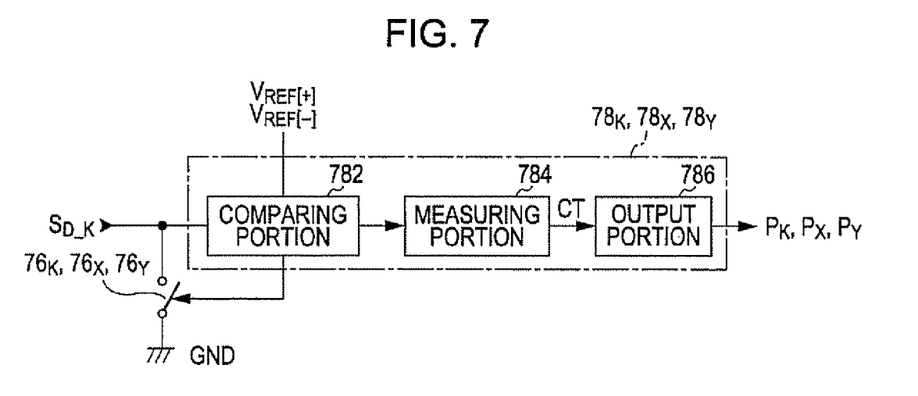
FIG. 7 is a block diagram that shows a specific configuration of a position identification circuit.

The position identification circuit 78K shown in FIG. 5 is a device that identifies the detection electrode 40K, to which the pointing body is in proximity, among the six detection electrodes 40K on the basis of the detection signals SD_K. As shown in FIG. 7, the position identification circuit 78K includes a comparing portion 782, a measuring portion 784 and an output portion 786. The comparing portion 782 is a device that compares the voltage of the detection signal SD_K with the voltage VREF[+] and the voltage VREF[−]. The comparing portion 782 sets the switch 76K to a conductive state when the voltage of the detection signal SD_K is in the range A and sets the switch 76K to be a non-conductive state when the voltage of the detection signal SD_K is outside the range A. In addition, the comparing portion 782 notifies the measuring portion 784 of the time point at which the detection signal SD_K changes to go outside the range A (the time point at which the detection signal SD_K becomes higher than the voltage VREF[+], and the time point at which the detection signal SD_K becomes lower than the voltage VREF[−]) and also notifies the measuring portion 784 of the time point at which the detection signal SD_K changes to fall within the range A (the time point at which the detection signal SD_K becomes lower than the voltage VREF[+], and the time point at which the detection signal SD_K becomes higher than the voltage VREF[−]).

The measuring portion 784 is a device that measures the length of time T (T1 to T6) during which the voltage of the detection signal SD_K is outside the range A in each of the detection periods D1 to D6 on the basis of the comparison result by the comparing portion 782. The measuring portion 784 of the present embodiment is a counter circuit that starts counting in synchronization with a predetermined clock signal when the comparing portion 782 notifies the measuring portion 784 that the voltage of the detection signal SD_K changes to go outside the range A, and that stops counting when the comparing portion 782 notifies the measuring portion 784 that the detection signal SD_K changes to fall within the range A. Thus, a counted value CT output from the measuring portion 784 in the detection period Di is a numeric value that corresponds to the length of time during which the detection signal SD_K is outside the range A. In the case exemplified in FIG. 2, the counted value CT in the detection period D2 is larger than the counted values CT in the other detection periods D (D1, D3 to D6).

The output portion 786 is a device that generates and outputs a position signal PK that indicates a position of the pointing body on the basis of the measurement result by the measuring portion 784. The output portion 786 of the present embodiment, when the counted value CT exceeds a predetermined reference value in the detection period Di, generates and outputs the position signal PK that indicates the i-th detection electrode 40K. As exemplified in FIG. 2, when the counted value CT exceeds the reference value in the detection period D2, the position signal PK that indicates the second detection electrode 40K is output from the output portion 786. In the upper level device of the liquid crystal device 100, an intersection of the detection electrode 40X indicated by the position signal PX and the detection electrode 40Y indicated by the position signal PY is identified as a position of the pointing body.

As described above, in the present embodiment, because the initial voltage V0 induced in each of the detection electrodes 40X and each of the detection electrodes 40Y because of a variation in voltage of the opposite electrode 12 is used to identify a position of the pointing body, the variation in voltage of the opposite electrode 12 never causes a decrease in detection accuracy. Thus, it is possible to identify a position of the pointing body in high accuracy.

Meanwhile, only in terms of suppressing a decrease in detection accuracy due to a variation in the common signal SCOM, a configuration (hereinafter, referred to as "comparative embodiment") in which a position of the pointing body is detected in a period other than the period when the common signal SCOM varies (for example, an interval between the adjacent frame periods F) may also be employed. However, in the comparative embodiment, it is necessary to ensure a period during which a position of the pointing body is detected, a period of time that can be actually used to display an image is restricted. Thus, there will be a problem that the lightness of an image is insufficient or a problem that power consumption increases in order to ensure sufficient lightness. According to the present embodiment, because display of an image and identification of a position of the pointing body are executed in parallel with each other, it is possible to eliminate the problems of the comparative embodiment, that is, insufficient lightness or an increase in power consumption.

In addition, in the present embodiment, the detection electrodes 40K are formed on the surface of the first substrate 10. Thus, in comparison with a configuration in which the detection electrodes 40X and the detection electrodes 40Y are formed on a substrate that is different from the first substrate 10 and then the substrate is fixed to the first substrate 10, the number of components of the liquid crystal device 100 may be reduced and a thin-shaped liquid crystal device 100 may also be achieved. Moreover, there is another advantage that the usability of light emitted from a lighting unit is improved by an amount by which a substrate exclusively used for adhering the detection electrodes 40K is omitted.

Note that, in order to suppress a decrease in detection accuracy due to a variation in voltage of the opposite electrode 12 in the configurations described in JP-A-5-19233, JP-A-8-44493, JP-A-2000-81610 and JP-T-2003-511799, it is necessary to arrange the opposite electrode 12 and detection electrodes so as to be sufficiently spaced apart from each other. In contrast to the above, in the present embodiment, in order to reliably induce an initial voltage V0 when the voltage of the opposite electrode 12 is varied, each of the detection electrodes 40X and each of the detection electrodes 40Y are desirably arranged as close as possible to the opposite electrode 12. That is, the configuration of the present embodiment, in which the detection electrodes 40K are arranged in proximity to the opposite electrode 12 in terms of thin-shaping and improvement in the usability of irradiation light, is extremely suitable in the aspects of the invention. However, a configuration in which a substrate, on which the electrode layer 40 is formed, is fixed to the first substrate 10 in a contact relationship or in a spaced-apart relationship may also be employed.

In addition, because the opposite electrode 12 in the present embodiment is interposed between the second substrate 20 and the detection electrodes 40K over the entire first substrate 10, it is possible to shield noise, which is generated in the detection electrodes 40X and the detection electrodes 40Y due to a variation in voltage of elements (for example, pixel electrodes 22) formed on the second substrate 20, by the opposite electrode 12. Thus, there is another advantage that it is not necessary to interpose a shield, independent of the opposite electrode 12, between the pixel electrodes 22 and the opposite electrode 12.

Furthermore, in the present embodiment, every time the voltage of the detection signal SD_K changes to fall within the range A, the switch 76K is conducted. That is, the voltage of the detection portion NK and the voltage of the i-th detection electrode 40K are reliably initialized to the ground electric potential GND in the detection period Di. Thus, in comparison with a configuration in which no switch 76K is provided, there is an advantage that it is possible to measure the lengths of time T1 to T6 with high accuracy by eliminating the influence of the voltage of the detection electrode 40K and the voltage of the detection portion NK in the preceding detection period Di. Note that the voltage VREF[+] and the voltage VREF[−] are typically fixed values; however, for example, they may be variably controlled in response to accuracy required for detecting the pointing body or performance (resolution) of the position identification circuit 78.

B: Second Embodiment

Next, a second embodiment of the invention will be described. Note that, in the present embodiment, the elements that are common to those of the first embodiment are assigned with the same reference numerals, and the description is appropriately omitted.

Figure 8:
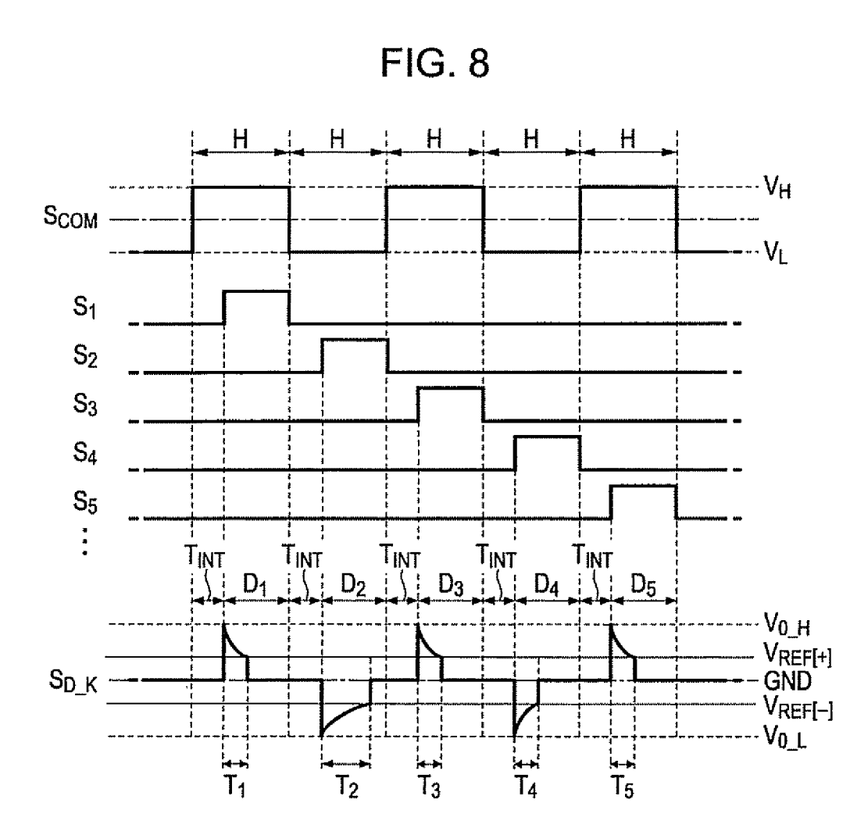
FIG. 8 is a timing chart that illustrates an operation of a liquid crystal device according to a second embodiment.

FIG. 8 is a timing chart that illustrates an operation of the liquid crystal device 100 according to the present embodiment. As shown in the drawing, the common signal SCOM supplied to the opposite electrode 12 alternately changes from one of the voltage VH and the voltage VL to the other at the start point of each horizontal scanning period H. The horizontal scanning period H is a period during which a voltage corresponding to an image signal is supplied to each of the pixel electrodes 22 arranged in one row.

The i-th horizontal scanning period H within the frame period F includes the initialization period TINT and the detection period Di. In the initialization period TINT, an initial voltage V0 is induced in each of the detection electrodes 40K on the basis of a variation in voltage of the common signal SCOM. In the detection period Di, the selection signal Si is shifted to a high level and, thereby, the i-th detection electrode 40K is connected to the detection portion NK. That is, the voltage of the detection signal SD_K in the detection period Di is set to the ground electric potential GND at the time point at which the voltage of the detection signal SD_K is decreased from the initial voltage V0_H to the voltage VREF [+] in the horizontal scanning period H when the common signal SCOM is set to the voltage VH, and is set to the ground electric potential GND at the time point at which the voltage of the detection signal SD_K is increased from the initial voltage V0_L to the voltage VREF[−] in the horizontal scanning period H when the common signal SCOM is set to the voltage VL. Thus, the measuring portion 784 sequentially measures each of the lengths of time T1 to T6 every horizontal scanning period H. With the present embodiment as well, the same advantageous effects as those of the first embodiment are obtained.

C: Alternative Embodiments

The above described embodiments may be modified into various alternative embodiments. Specific alternative embodiments may be exemplified as follows. Note that the following embodiments may be combined appropriately.

(1) First Alternative Embodiment

In the above described embodiments, the case where the pointing body contacts one of the detection electrodes 40K is exemplified; however, actually, there is a case where the pointing body is in proximity to the plurality of detection electrodes 40K. When the pointing body is in proximity to the plurality of detection electrodes 40K, the length of time T measured at the time when each of the detection electrodes 40K is connected to the detection portion NK varies gradationally on the basis of a distance between each of the detection electrodes 40K and the pointing body and an area of contact therebetween. Thus, a configuration that identifies a position of the pointing body on the basis of a relative ratio of the length of time T corresponding to each of the plurality of detection electrodes 40K is employed. For example, when the length of time T1 measured in the detection period D1 and the length of time T2 measured in the detection period D2 both exceed a reference value (that is, when the pointing body is in proximity to the first detection electrode 40K and the second detection electrode 40K), a point at which an interval between the first detection electrode and the second detection electrode is divided in a ratio of T1:T2 is identified as a position of the pointing body.

(2) Second Alternative Embodiment

In the first embodiment, the configuration in which a position of the pointing body is identified in both the frame period F when the common signal SCOM of the opposite electrode 12 is set to the voltage VH and the frame period F when the common signal SCOM is set to the voltage VL is exemplified; however, a configuration in which identification (connection of each of the detection electrodes 40K to the detection portion NK and measurement of the length of time T in each connection) of a position of the pointing body is executed only in any one of the frame periods F may also be employed. In addition, the voltage of the common signal SCOM may be configured to vary in units of the plurality of frame periods F.

Furthermore, in the second embodiment, the configuration in which the length of time T of each of the detection electrodes 40K is measured every horizontal scanning period H is exemplified; however, a configuration in which the lengths of time T regarding the plurality of detection electrodes 40K are measured in each of the horizontal scanning periods H (that is, a configuration in which one horizontal scanning period H includes the plurality of detection periods Di) may also be employed. The voltage of the common signal SCOM may be varied in units of the plurality of horizontal scanning periods H.

(3) Third Alternative Embodiment

In the above described embodiments, the configuration in which a position of the pointing body is identified on the basis of a voltage of the detection portion NK is exemplified; however, a position of the pointing body may be identified on the basis of an electric current that flows through the detection portion NK in the detection period Di. That is, the detection signal SD_K is a voltage signal or an electric current signal, which corresponds to an electrical state of the detection portion NK when the plurality of detection electrodes 40K are sequentially connected to the detection portion NK.

(4) Fourth Alternative Embodiment

In the above described embodiment, a configuration in which the electrodes 45 and the electrodes 46 are arranged in a matrix is exemplified; however, the shape of each electrode and arrangement of the electrodes may be selected. For example, in a configuration in which an image of an operator having a predetermined shape is displayed by the liquid crystal 30, the shape and/or arrangement of the electrodes may be given so as to overlap an area in which the image of the operator is displayed. In addition, in the above described embodiments, the configuration in which both positions in the X direction and in the Y direction of the pointing body are identified is exemplified; however, a configuration in which only a position in the X direction of the pointing body is identified using the detection electrodes 40X and the detection circuit 60X (a configuration in which the detection electrodes 40Y and the detection circuit 60Y are omitted) may also be employed.

(5) Fifth Alternative Embodiment

An alignment mode of the liquid crystal 30 may be selected. For example, the aspects of the invention may be applied to various liquid crystal devices 100 that use a TN (Twisted Nematic) mode, a VA (Vertical Alignment) mode, or an ECB (Electrically Controlled Birefringence) mode. In addition, the configuration in which the opposite electrode 12 is formed on the first substrate 10 is not necessary in the aspects of the invention. For example, the aspects of the invention may also be applied to a liquid crystal device, such as an IPS (In Plane Switching) mode liquid crystal device or an FFS (Fringe Field Switching) mode liquid crystal device, in which opposite electrodes are formed on the side of the second substrate 20.

D: Application Examples

Figure 9:
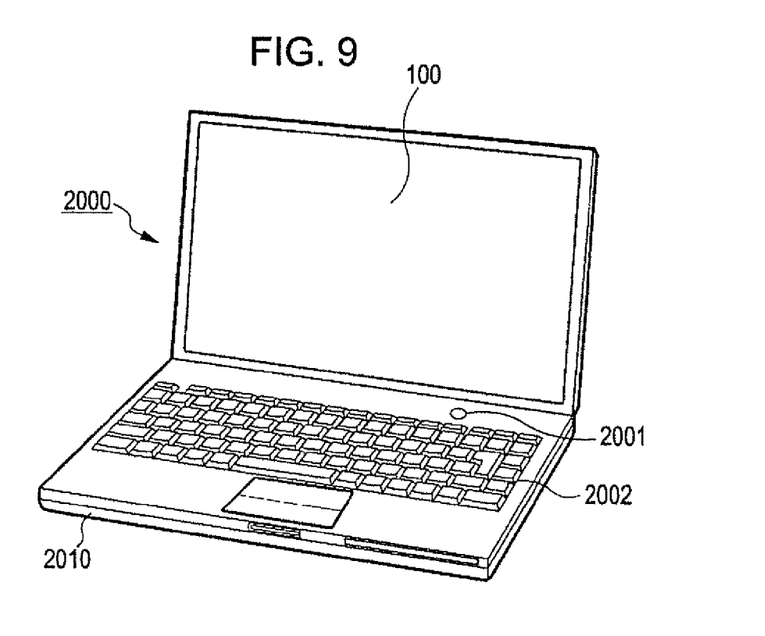
FIG. 9 is a perspective view that shows an embodiment (personal computer) of an electronic apparatus according to the invention.
Figure 10:
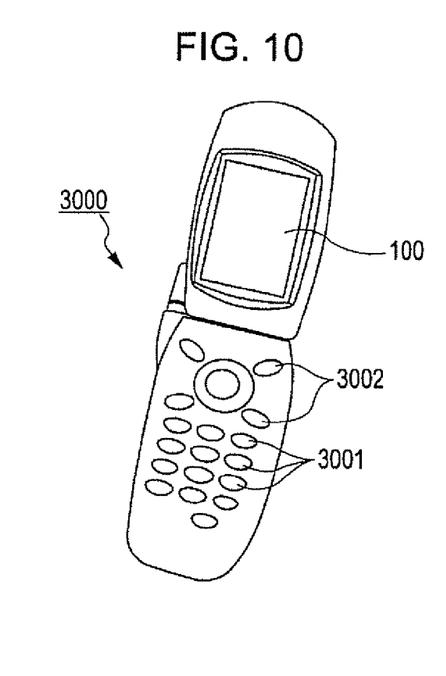
FIG. 10 is a perspective view that shows an embodiment (cellular phone) of an electronic apparatus according to the invention.
Figure 11:
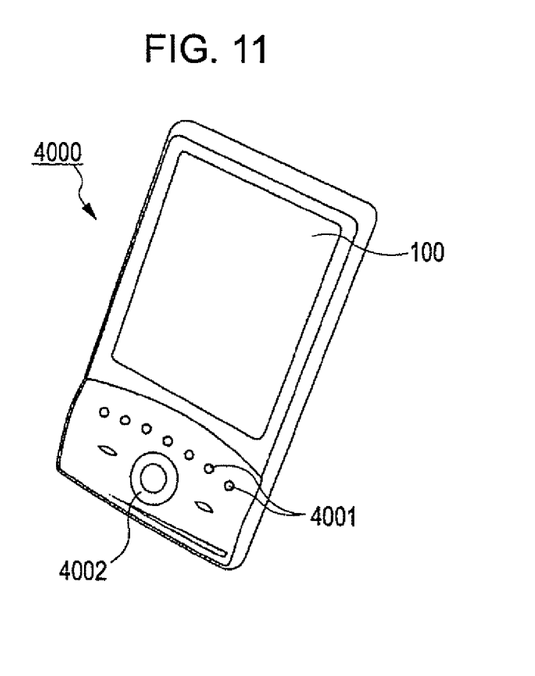
FIG. 11 is a perspective view that shows an embodiment (personal digital assistants) of an electronic apparatus according to the invention.

Next, electronic apparatuses that use the liquid crystal device according to the aspects of the invention will be described. FIG. 9 to FIG. 11 are views that show embodiments of electronic apparatuses that use the liquid crystal device 100 according to any one of the embodiments described above as a display device.

FIG. 9 is a perspective view that shows a configuration of a mobile personal computer that uses the liquid crystal device 100. The personal computer 2000 includes the liquid crystal device 100 that displays various images and a body portion 2010 in which a power switch 2001 and a keyboard 2002 are installed.

FIG. 10 is a perspective view that shows a configuration of a cellular phone that uses the liquid crystal device 100. The cellular phone 3000 includes a plurality of operation buttons 3001, a plurality of scroll buttons 3002, and the liquid crystal device 100 that displays various images. By manipulating the scroll buttons 3002, a screen displayed on the liquid crystal device 100 will be scrolled.

FIG. 11 is a perspective view of a configuration of a personal digital assistants (PDA) to which the liquid crystal device 100 is applied. The personal digital assistants 4000 includes a plurality of operation buttons 4001, a power switch 4002 and the liquid crystal device 100 that displays various images. As the power switch 4002 is manipulated, various pieces of information, such as an address book and a schedule book, are displayed on the liquid crystal device 100.

Note that the electronic apparatuses that employ the liquid crystal device according to the aspects of the invention include, in addition to the apparatuses shown in FIG. 9 to FIG. 11, a digital still camera, a television, a video camera, a car navigation system, a pager, an electronic personal organizer, an electronic paper, an electronic calculator, a word processor, a workstation, a video telephone, a POS terminal, a printer, a scanner, a photocopier, and a video player.

What is claimed is:

1. A liquid crystal device comprising:
a first substrate;
a second substrate opposed to the first substrate;
a liquid crystal sealed in a gap between the first substrate and the second substrate;
an opposite electrode having a voltage which periodically varies;
a plurality of detection electrodes, an initial voltage being induced in each of the plurality of detection electrodes based on a variation in the voltage of the opposite electrode;
a switching circuit configured to enable the production of a detection signal by sequentially connecting each of the plurality of detection electrodes which are being induced with the initial voltage based on the variation in the voltage of the opposite electrode; and
a position identification device configured to, using the detection signal produced by sequentially connecting each of the plurality of detection electrodes which are being induced with the initial voltage based on the variation in the voltage of the opposite electrode, generate a position signal that indicates a position of a pointing body.

2. The liquid crystal device of claim 1, wherein the position identification device is configured to generate the position signal based on the length of time during which a voltage of the detection signal is outside a predetermined range because of the detection electrode being connected to the detection portion.

3. The liquid crystal device of claim 1, which includes an electric discharge device configured to, when a voltage of the detection signal is first changed to go outside a predetermined range by connecting a corresponding one of the detection electrodes to the detection portion and then changed to fall within the predetermined range, discharge electric charge stored in the corresponding one of the detection electrodes.

4. The liquid crystal device of claim 1, wherein the opposite electrode is continuously formed over an entire surface of the first substrate.

5. The liquid crystal device of claim 1, wherein the plurality of detection electrodes are:
   (a) formed on a side of the first substrate, which is opposite to a side on which the liquid crystal is provided; and
   (b) opposed to the opposite electrode via the first substrate.

6. An electronic apparatus comprising:
   a liquid crystal device including:
      (a) a first substrate;
      (b) a second substrate opposed to the first substrate;
      (c) a liquid crystal sealed in a gap between the first substrate and the second substrate;
      (d) an opposite electrode having a voltage which periodically varies;
      (e) a plurality of detection electrodes, an initial voltage being induced in each of the plurality of detection electrodes based on a variation in the voltage of the opposite electrode;
      (f) a switching circuit configured to enable the production of a detection signal by sequentially connecting each of the plurality of detection electrodes which are being induced with the initial voltage based on the variation in the voltage of the opposite electrode; and
      (g) a position identification device configured to, using the detection signal produced by sequentially connecting each of the plurality of detection electrodes which are being induced with the initial voltage based on the variation in the voltage of the opposite electrode, generate a position signal that indicates a position of a pointing body.

7. A method of identifying a position of a pointing body in a liquid crystal device that includes a first substrate; a second substrate opposed to the first substrate; a liquid crystal sealed in a gap between the first substrate and the second substrate; an opposite electrode having a voltage which periodically varies; a plurality of detection electrodes, an initial voltage being introduced in each of the plurality of detection electrodes based on the a variation in the voltage of the opposite electrode, the method comprising: (a) causing a switching circuit to enable the production of a detection signal by sequentially connecting each of the plurality of detection electrodes which are being induced with the initial voltage based on the variation in the voltage of the opposite electrode; and (b) using the detection signal produced by sequentially connecting each of the plurality of detection electrodes which are being induced with the initial voltage based on the variation in the voltage of the opposite electrode to generate a position signal that indicates a position of the pointing body.

* * * * *